United States Patent
Yasuda

(10) Patent No.: US 11,706,526 B2
(45) Date of Patent: Jul. 18, 2023

(54) FOCUSING POSITION DETECTION METHOD, FOCUSING POSITION DETECTION DEVICE AND RECORDING MEDIUM

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/554,701

(22) Filed: Dec. 17, 2021

(65) Prior Publication Data

US 2022/0217264 A1 Jul. 7, 2022

(30) Foreign Application Priority Data

Jan. 7, 2021 (JP) ................... 2021-001598

(51) Int. Cl.
 *H04N 23/67* (2023.01)
(52) U.S. Cl.
 CPC .................... *H04N 23/67* (2023.01)
(58) Field of Classification Search
 CPC ......... H04N 5/23212; H04N 5/232127; H04N 17/002; H04N 23/67; H04N 23/675; G02B 7/38; G02B 21/244
 See application file for complete search history.

(56) References Cited

U.S. PATENT DOCUMENTS

| 10,116,848 B2 * | 10/2018 | Kokubo ............... G01N 21/253 |
| 2013/0100272 A1 * | 4/2013 | Price ........................ H04N 9/09 348/E5.045 |
| 2014/0300802 A1 | 10/2014 | Hamano |
| 2014/0313398 A1 | 10/2014 | Hamano |
| 2020/0322530 A1 * | 10/2020 | Choi ..................... H04N 5/2356 |
| 2021/0105413 A1 * | 4/2021 | Suzuki ................. H04N 5/2354 |
| 2021/0250515 A1 * | 8/2021 | Yasuda ...................... G06T 7/70 |

FOREIGN PATENT DOCUMENTS

| JP | 07-318784 A | 12/1995 |
| JP | 2016-223931 A | 12/2016 |

OTHER PUBLICATIONS

Extended European Search Report issued in corresponding European Patent Application No. 21213026.4-1020, dated Jun. 8, 2022.

* cited by examiner

*Primary Examiner* — Shahbaz Nazrul
(74) *Attorney, Agent, or Firm* — McDermott Will & Emery LLP

(57) ABSTRACT

In a focusing position detection method, a plurality of object images are acquired by imaging an imaging object by an imager while changing a focal position in M stages along an optical axis. A saturation consecutive region is acquired. The saturation consecutive region is included in all N (where N is a natural number equal to or more than three and equal to and less M) object images acquired while successively changing the focal position in N stages along the optical axis. A focusing degree decrease as the focal position approaches focusing position in the saturation consecutive region. Based on this property, the focusing position is detected.

9 Claims, 11 Drawing Sheets

FOCUSING POSITION DETECTION METHOD, FOCUSING POSITION DETECTION DEVICE AND RECORDING MEDIUM

CROSS REFERENCE TO RELATED APPLICATION

The disclosure of Japanese Patent Application No. 2021-001598 filed on Jan. 7, 2021 including specification, drawings and claims is incorporated herein by reference in its entirety.

BACKGROUND OF THE INVENTION

1. Field of the Invention

The present invention relates to a focusing position detection technology for detecting a focusing position on the basis of a plurality of object images acquired by imaging an imaging object by using an imager while changing a focal position along an optical axis.

2. Description of the Related Art

In some cases, for culture and analysis of cells, used are images obtained by imaging a specimen containing the cells. The specimen is prepared by using a flat plate-like container provided with a plurality of wells (recesses), which is referred to as a well plate, a microplate, or the like, or a flat dish-like container referred to as a dish provided with a single well. In order to excellently image the cells which are the imaging objects, it is necessary to adjust a focal position by detecting a focusing position. Then, proposed is a focusing position detection technology for detecting a focusing position on the basis of a plurality of object images acquired by imaging an imaging object by using an imager while changing a focal position along an optical axis (Japanese Patent Application Laid Open Gazette Nos. 7-318784 and 2016-223931, and the like).

SUMMARY OF THE INVENTION

However, an image acquired by imaging a specimen may include a high-luminance region where the luminance of pixels corresponding to specific cells and the like is extremely high. This high luminance region is a saturation region where the luminance is saturated. Accordingly, it is also considered to detect a focusing position after a saturation region is removed from an image including the saturation region. However, all light emitting parts may be removed from the image by removing the saturation region and it may become difficult to detect the focusing position. In such a case, it is also considered to detect the focusing position by applying the conventional technique only to the saturation region. However, as described later, erroneous detection occurs if the conventional technique is directly applied, e.g. the focusing position is detected from an area of the pixels corresponding to the saturation region.

This invention was developed in view of the above problem and aims to provide a focusing position detection technique capable of stably detecting a focusing position even if a plurality of object images acquired by imaging an imaging object by an imager while changing a focal position along an optical axis include a saturation region (high luminance region).

A first aspect of the invention is a focusing position detection method, comprising: a first step of acquiring M (where M is a natural number equal to or more three) object images by imaging an imaging object by an imager while changing a focal position in M stages along an optical axis; a second step of acquiring a saturation region exceeding a predetermined luminance from the M object images; a third step of acquiring a saturation consecutive region, the saturation region being included in all N (where N is a natural number equal to or more than three and equal to and less M) object images acquired while successively changing the focal position in N stages along the optical axis in the saturation consecutive region; a fourth step of obtaining a focusing degree indicating a degree of focusing from the object image for each object image; a fifth step of determining whether or not a local minimum value of the focusing degree is present when the focusing degrees obtained in the fourth step are arranged in an order of the focal positions; a sixth step of correcting N focusing degrees corresponding to the saturation consecutive region, out of M focusing degrees obtained in the fourth step, based on a property that the focusing degree decreases as the focal position approaches the focusing position in the saturation consecutive region when the presence of the local minimum value is determined in the fifth step; and a seventh step of specifying the focusing position based on N focusing degrees corrected by the sixth step and (M-N) focusing degrees not corrected by the sixth step.

A second aspect of the invention is a focusing position detector for detecting a focusing position based on M (where M is a natural number equal to or more three) object images acquired by imaging an imaging object by an imager while changing a focal position in M along an optical axis, the device comprising: a saturation region acquisitor for acquiring a saturation region exceeding a predetermined luminance from the M object images; a saturation consecutive region acquisitor for acquiring a saturation consecutive region, the saturation region being included in all N (where N is a natural number equal to or more than three and equal to and less M) object images acquired while successively changing the focal position in N stages along the optical axis in the saturation consecutive region; a focusing degree calculator for calculating a focusing degree indicating a degree of focusing from the object image for each object image; a focusing degree corrector for correcting the N focusing degrees corresponding to the saturation consecutive region, out of M focusing degrees, based on a property that the focusing degree decreases as the focal position approaches the focusing position in the saturation consecutive region when the focusing degrees arranged in an order of the focal positions and calculated by the focusing degree calculator have a local minimum value; and a focusing position specifier for specifying the focusing position based on N focusing degrees corrected by the focusing degree corrector and (M-N) focusing degrees not corrected by the focusing degree corrector.

A third aspect of the invention is a non-transitory computer readable recording medium having stored thereon a computer program configured to cause a computer to carry out the steps of the focusing position detection method.

As described above, according to the invention, a focusing position can be stably detected even if a plurality of object images acquired by imaging an imaging object by the imager while changing a focal position along an optical axis include a saturation region (high luminance region).

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

DETAILED DESCRIPTION OF THE PREFERRED EMBODIMENTS

Figure 1:
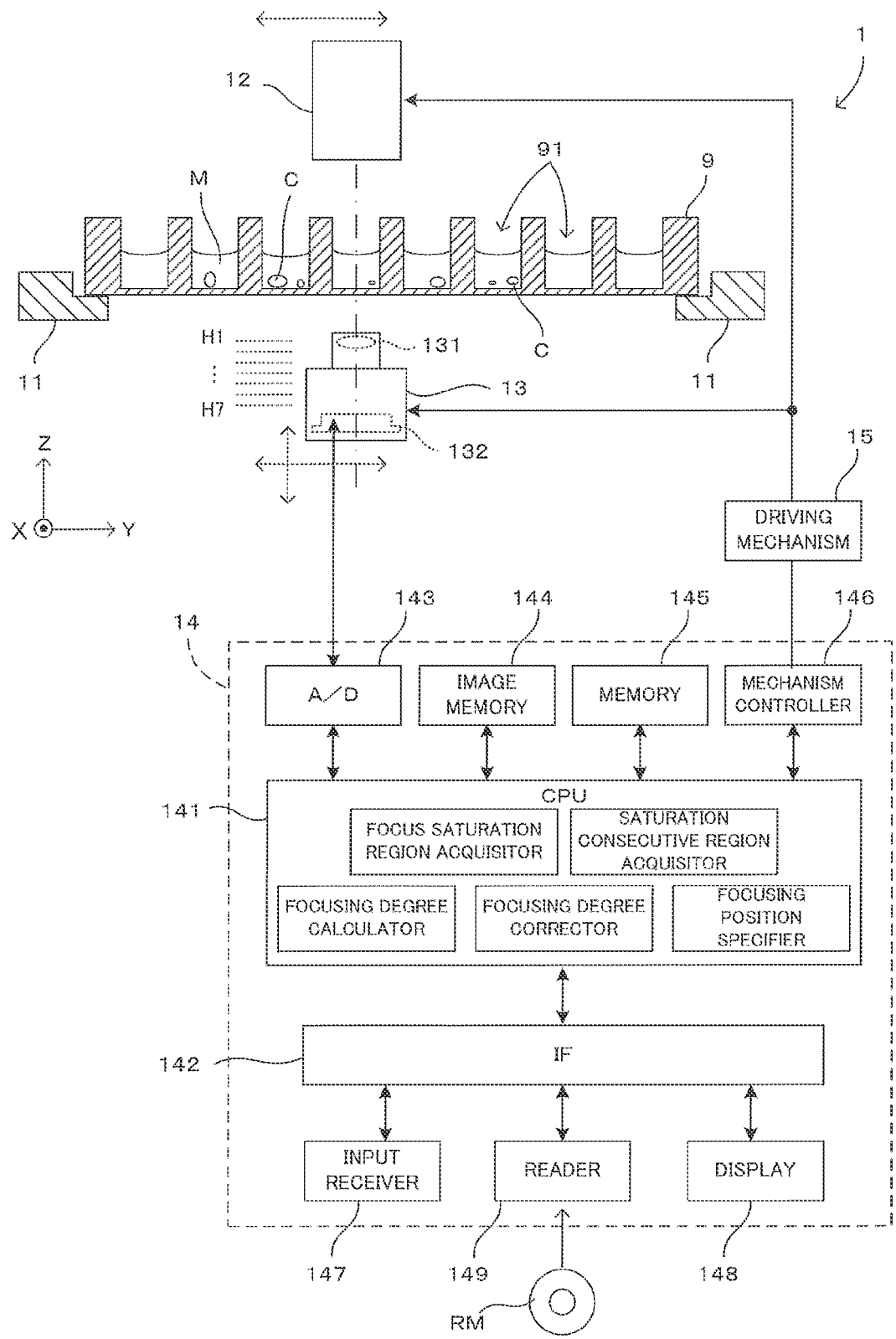
FIG. 1 is a diagram showing a schematic configuration of an imaging apparatus equipped with one embodiment of a focusing position detection apparatus in accordance with the present invention.
Figure 2A:
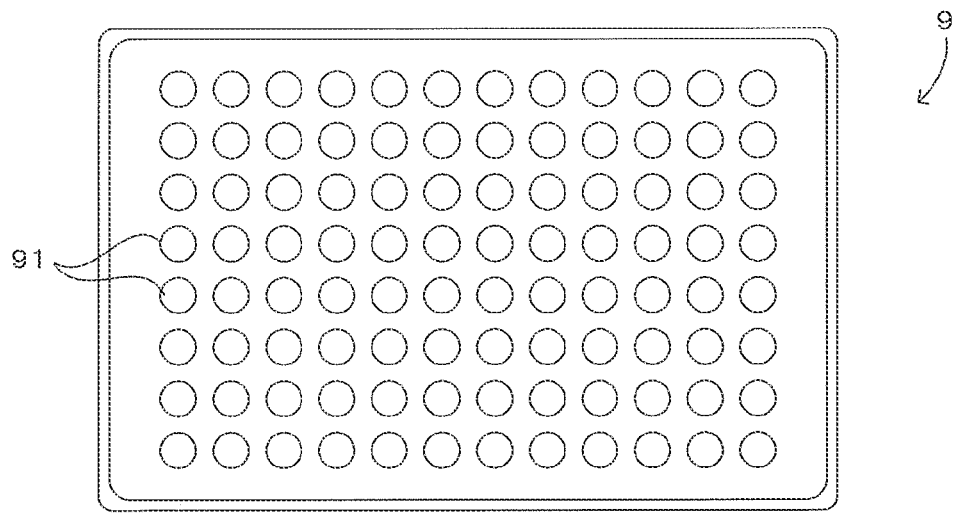
FIGS. 2A and 2B are drawings showing an example of a well plate used in the invention.
Figure 2B:
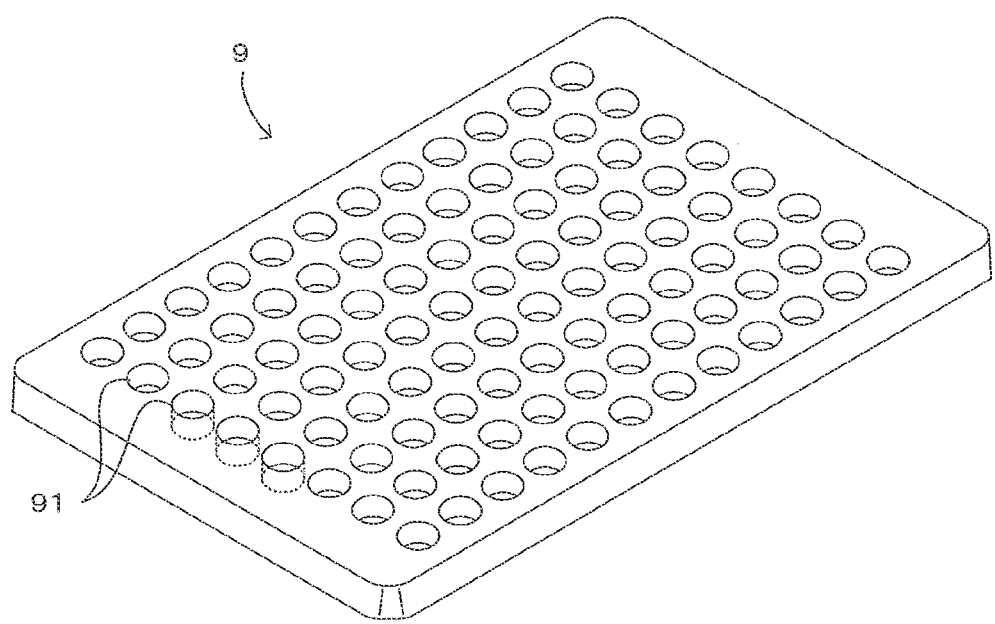

FIG. 1 is a diagram showing a schematic configuration of an imaging apparatus equipped with one embodiment of a focusing position detection apparatus in accordance with the present invention. FIGS. 2A and 2B are drawings showing an example of a well plate used in the invention. Specifically, FIG. 2A is a top view of a well plate and FIG. 2B is a perspective view of the well plate. Here, XYZ orthogonal coordinate axes are set as shown in FIG. 1 to comprehensively show directions in each figure. For example, the XY plane can be considered as a horizontal plane and the Z axis as a vertical axis. In the following, the (−Z) direction is vertically downward.

The imaging apparatus 1 is an apparatus for imaging a living specimen such as cells, cell colonies and bacteria (hereinafter, referred to as "cells and the like" and denoted by C) cultured in the culture medium carried in recesses called the wells 91 formed in the upper surface of the well plate 9. A transparent resin which transmits visible light is, for example, used as a material of the well plate 9. The plurality of wells 91 are regularly arranged in the upper surface of the well plate 9. The wells 91 hold a plurality of cells serving as an imaging object together with a culture medium. Note that the size of the well plate and the number of the wells to be imaged by this imaging apparatus 1 are not limited to these and are arbitrary. For example, well plates having 6 to 384 holes are generally used. Further, this imaging apparatus 1 can be used also in imaging cells and the like cultured, for example, in a flat container called a dish without being limited to use for well plates including a plurality of wells. In this embodiment, the wells 91 are described to have a circular shape in a top view. However, the wells 91 may have another shape such as a rectangular shape or a rounded rectangular shape.

A predetermined amount of a liquid serving as a culture medium M as shown in FIG. 1 is injected into each well 91 of the well plate 9, and the cells and the like C cultured under predetermined culture conditions in this liquid become an imaging object of this imaging apparatus 1. The culture medium M may be added with an appropriate reagent or may be gelled after being injected in a liquid state into the wells 91. In this imaging apparatus 1, for example, cells and the like C cultured, on the inner bottom surfaces of the wells 91 can be imaged.

The imaging apparatus 1 includes a holder 11 which holds the well plate 9, an illuminator 12 arranged above the holder 11, an imager 13 arranged below the holder 11 and a controller 14 which includes a CPU 141 controlling the operation of these components. The holder 11 holds the well plate 9 in a substantially horizontal posture by being held in contact with a peripheral edge part of the lower surface of the well plate 9 carrying sample together with liquid in each well 91.

The illuminator 12 emits an illumination light toward the well plate 9 held by the holder 11. For example, a white LED (light emitting diode) may be used as a light source of the illumination light. A combination of the light source and an appropriate illumination optical system are used as the illuminator 12. The cells or the like in the well 91 disposed to the well plate 9 are illuminated by the illuminator 12 from above.

The imager 13 is provided below the well plate 9 held by the holder 11. In the imager 13, an imaging optical system is arranged at a position right below the well plate 9. An optical axis of the imaging optical system extends in a vertical direction. FIG. 1 shows a side view. A right and left direction of the figure indicates a horizontal direction and an up and down direction of the figure indicates a vertical direction (Z direction).

The imaging of the cells or the like in the well 91 is performed by the imager 13. Specifically, light emitted from the illuminator 12 and incident on the surface of the liquid from above the well 91 illuminates the imaging object. Light transmitted downward from the bottom surface of the well 91 is incident to a light receiving surface of an imaging element 132 via the imaging optical system of the imager 13 including an objective lens 131. An image of the imaging object formed on the light receiving surface of the imaging element 132 by the imaging optical system is imaged by the imaging element 132. The imaging element 132 is an area image sensor having a two-dimensional light receiving surface. A CCD sensor or a CMOS sensor can be used as the imaging element 132.

The imager 13 is capable of moving in the horizontal direction (XY direction) and the vertical direction (Z direction) by a mechanism controller 146 provided in the controller 14. Specifically, the mechanism controller 146 moves the imager 13 in the horizontal direction by operating a driving mechanism 15 based on a control command from the CPU 141. By doing so, the imager 13 moves relative to the well 91 in the horizontal direction. Further, focusing is performed by moving the imager 13 in the vertical direction. This focusing is performed based on the focusing position detected by the focusing position detection method described in detail later. When the imaging is performed in a state that a whole of the well 91 is included in a field of view, the mechanism controller 146 positions the imager 13 in the horizontal direction such that the optical axis of the imaging optical system coincides with the center of the well 91.

Further, the as indicated by arrows with dotted horizontal lines shown in FIG. 1, the driving mechanism 15 moves the illuminator 12 integrally with the imager 13 when the imager 13 is moved in the horizontal direction. Specifically, the illuminator 12 is arranged such that a center of emitted light substantially coincides with the optical axis of the imaging optical system. When the imager 13 moves in the horizontal direction, the illuminator 12 also moves in conjunction with the imager 13. By doing so, whichever well 91 is imaged, the center of the well W and the center of emitted light are always position on the optical axis of the imaging optical system. Consequently, the illuminating condition becomes constant regardless of which well 91 is to be imaged, wherefore imaging conditions can be maintained to be satisfactory.

The image signal output from the imaging element 132 of the imager 13 is send to the controller 14. The image signal is input to an AD converter (A/D) 143 provided in the controller 14 and converted into digital image data. The CPU 141 functions as an image processor which performs appropriate image processings based on the received image data. The controller 14 further includes an image memory 144 for storing image data and a memory 145 for storing programs to be executed by the CPU 141 and data generated by the CPU 141, but these may be integrated. The CPU 141 performs saturation region acquisition processing, a saturation consecutive region acquisition processing, a focus degree calculation processing, a focusing degree correction processing, a focusing position specifying processing and the like. Thus, the CPU 141 detects the focusing position. In other words, the CPU 141 serves as the "focus saturation region acquisitor", "saturation consecutive region acquisitor", "focusing degree calculator", "focusing degree corrector for correcting the N focusing d" and "focusing position specifier", and part of the control program corresponds to an example of the "focusing position detection program" of the present invention.

Besides, the controller 14 is provided with an interface (I/F) 142. The interface 142 has a function of receiving an operation input from a user and presenting information such as processing results to the user. The controller 14 also has a function of performing data exchange with an external apparatus connected via a communication line. To realize the user interface function, an input receiver 147 for receiving an operation input from the user, a display 148 for displaying the messages to the user, a processing result or the like and a reader 149 reading from a computer-readable non-transitory recording medium RM are connected to the interface 142.

Note that the controller 14 may be an exclusive device including above hardware. Further, the controller 14 may be a general-purpose processing device such as a personal computer or a workstation installed with the control program for performing the process described later. Specifically, a general-purpose computer apparatus may be used as the controller 14 of the imaging apparatus 1. When a general-purpose processing device is used as the controller 14, the imaging apparatus 1 may have just a minimal control function for controlling each components of the imager 13 and the like.

Figure 3:
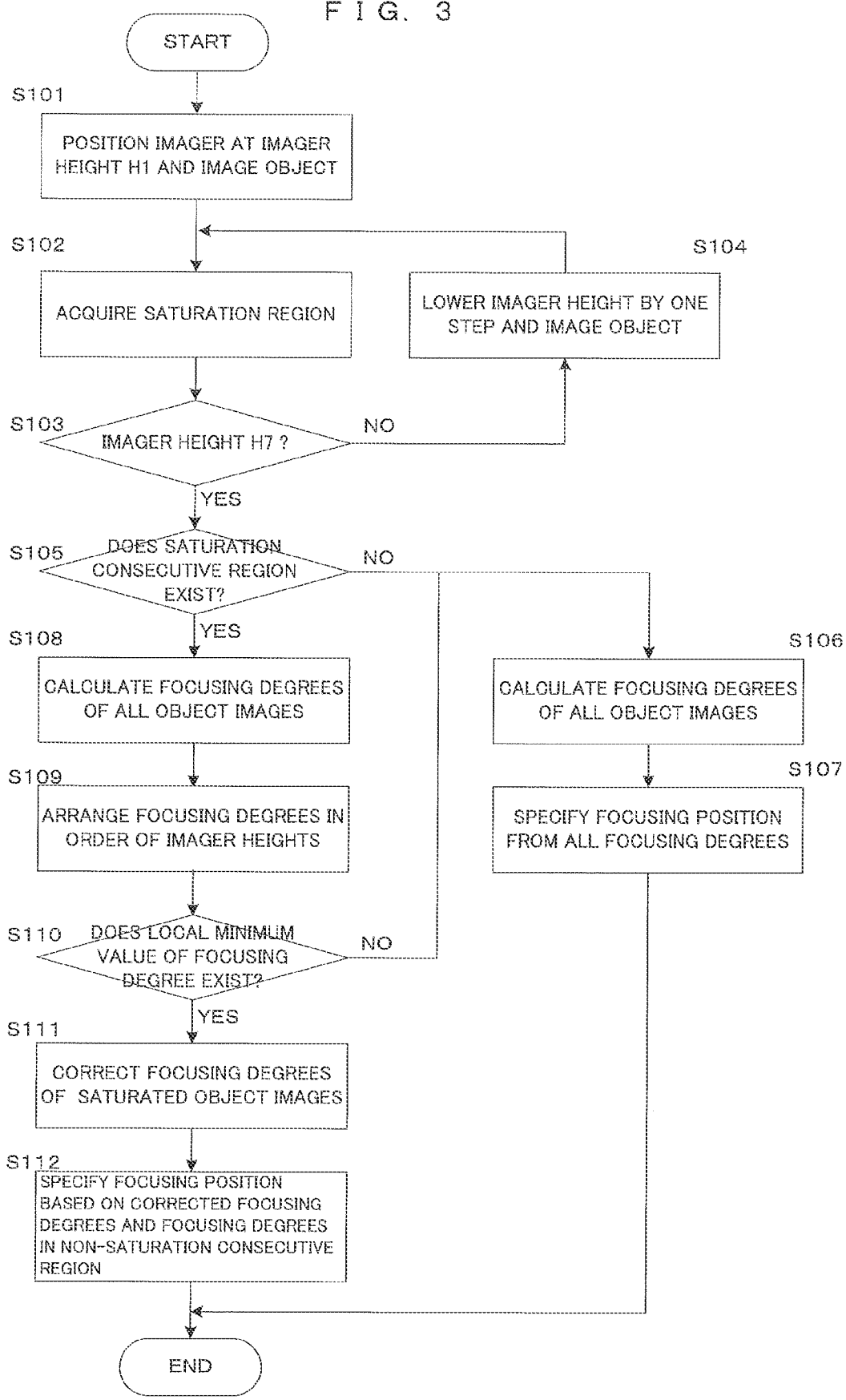
FIG. 3 is a flowchart showing one embodiment of a focusing position detection method performed by the imaging apparatus shown in FIG. 1.
Figure 4:
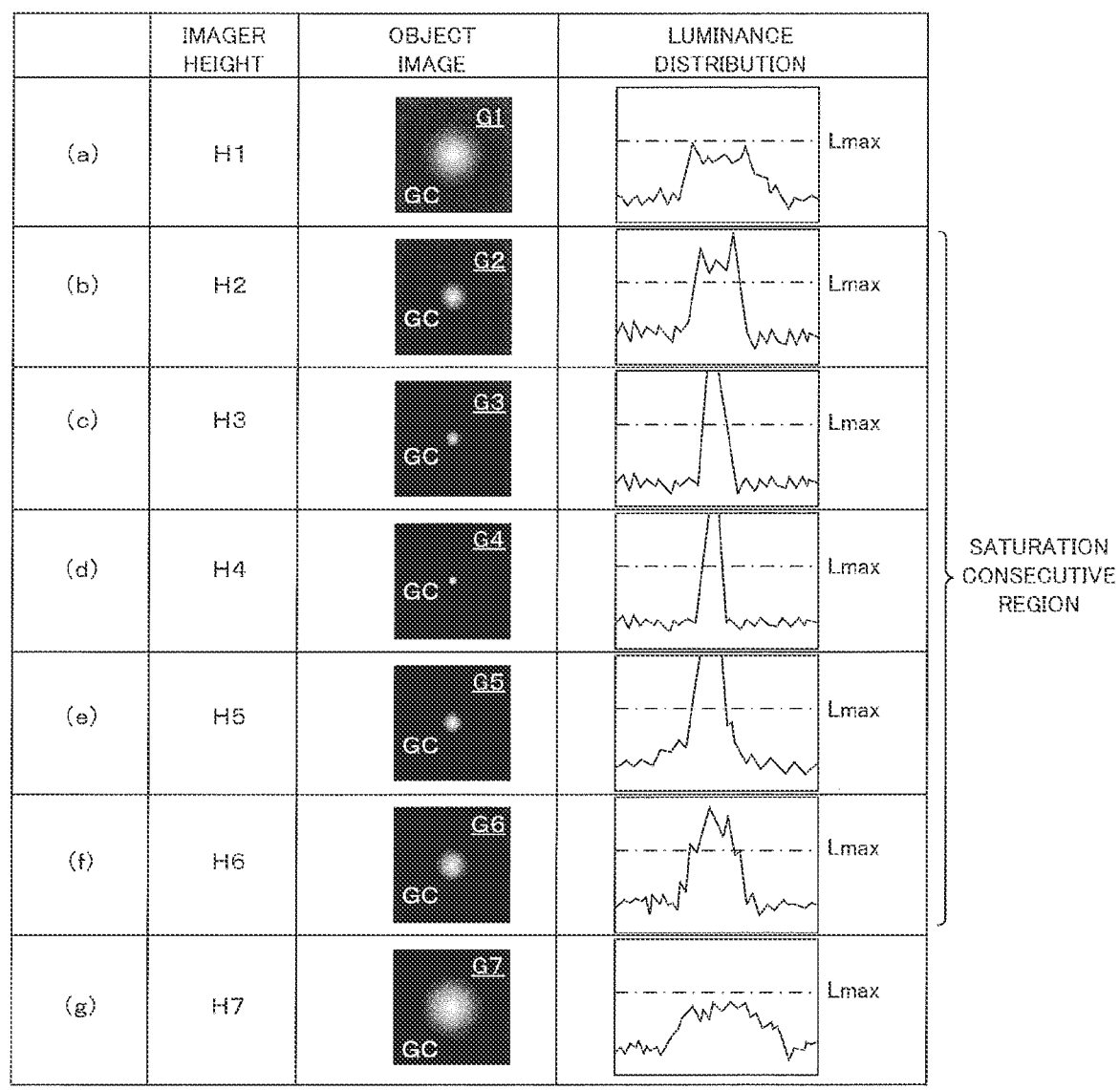
FIG. 4 is a diagram schematically showing part of a process performed in the focusing position detection method.

FIG. 3 is a flowchart showing one embodiment of a focusing position detection method performed by the imaging apparatus shown in FIG. 1. Further, FIG. 4 is a diagram schematically showing part of a process performed in the focusing position detection method. The focusing position detection method is implemented when the CPU 141 provided in the controller 14 executes a pre-installed control program to cause the constituent parts of the apparatus to perform predetermined operations.

First, the driving mechanism 15 drives the imager 13 to set a horizontal position of the imager 13 so that a specific well 91, e.g. the well 91 located in a central part, falls within a field of view, and positions the imager 13 at an imager height H1 in the vertical direction Z so that a focal position of the objective lens 131 is at a predetermined initial position. In this state, the well 91 is imaged and image data of an object image G1 is stored in the image memory 144 (Step S101). The thus acquired object image G1 includes, for example, an image GC of a cell and the like C as shown in a row (a) of FIG. 4. The luminance of pixels constituting the image GC corresponds, for example, to fluorescent light emitted from the cell and the like C irradiated with excitation light.

After Step S101 described above is performed, Steps S102 to S104 are further repeatedly performed. In this way, seven object images G1 to G7 are acquired by imaging the cell and the like C by the imager 13 while making a distance from the imager 13 to the cell and the like C different in seven stages, i.e. changing the focal position in M stages (M=7 in this embodiment) along the optical axis (corresponding to a "first step" of the invention). Further, a saturation region exceeding a predetermined luminance Lmax is acquired, i.e. a saturation region acquisition process (corresponding to a "second step" of the invention) is performed (Step S102). Note that whether or not a region is a saturation region can be determined based on the number of the pixels exceeding the predetermined luminance Lmax.

Examples of the object images G1 to G7 and luminance distributions acquired in this way are shown in FIG. 4. In a column "Object Image" of FIG. 4, the examples of the object images G1 to G7 acquired in Step S101 are schematically shown. Further, in a column "Luminance Distribution", the luminance distributions of the images GC included in the object images G1 to G7 are shown. In FIG. 4, the image GC exceeds the predetermined luminance Lmax in a relatively wide imager height range (H2 to H6 in FIG. 4). That is, the saturation region (corresponding to the already described "high luminance region") where the luminance Lmax is saturated is included. Here, it is also considered to detect the focusing position after all the saturation regions are removed. However, if the saturation regions are removed, all light emitting parts are removed from the object images and it becomes difficult to detect the focusing position, for example, as can be understood from the column "Object Image" of FIG. 4.

Accordingly, it is also considered to detect the focusing position by applying the conventional technique only to the saturation region. For example, an approach to detect the focusing position from an area of the pixels corresponding to the saturation region is, for example, proposed. However, in the examples shown in FIG. 4, the focusing position is apparently present at or near the imager height H4. However, the area of the pixels corresponding to the saturation region is narrowest at the imager height H4 and becomes gradually wider with distance from the imager height H4. As just described, the saturation region becomes narrower and a focusing degree indicating a degree of focusing decreases as described later using FIG. 5 as the focal position approaches the focusing position. Accordingly, if the conventional technique is directly applied, it is difficult to accurately detect the focusing position. However, as described in detail later, if three or more object images including the saturation region are consecutive in an imager height direction, the focusing position can be accurately specified by utilizing the aforementioned property (the focusing degree decreases as the focal position approaches the focusing position). On the other hand, if no saturation region is present or two or less object images including the saturation region are consecutive in the imager height direction (see FIG. 10 to be described later), the focusing position can be specified by the previous method.

Accordingly, in this embodiment, as shown in FIG. 3, if the acquisition of the seven object images G1 to G7 and the detection of the saturation regions are completed, the acquisition of a saturation consecutive region is confirmed (Step S105: corresponding to a "third step" of the invention). The saturation consecutive region means a region in which the saturation region is included all the N object images acquired while successively changing the focal position in N stages along the optical axis as described above. In this embodiment, N is set equal to or more than three and equal to and less than M. For example, as shown in FIG. 4, each of the object images G2 to G6 captured at the consecutive imager heights (focal positions) H2 to H6 includes the saturation region, and a series of the object images G2 to G6 constitute the saturation consecutive region. For example, in the case of imaging a fluorescent sample, which locally strongly emits light by receiving light from the illuminator 12, by the imaging apparatus 1, the saturation consecutive region appears.

If no saturation consecutive region was confirmed in Step S105, the focusing degree is calculated from each of the object images G1 to G7 at any of the imager heights H1 to H7 as before (Step S106). The following conventionally known one can be used as the focusing degree:

(1) an index value (average luminance value, contrast, edge intensity, etc.) corresponding to the luminance of the pixels constituting the image GC included in the object image G1 to G7;

(2) an index value obtained by multiplying the above index value by a coefficient according to the area or value of the image GC and (3) an index value analytically calculated from a luminance histogram of the pixels constituting the image GC. When the calculation of the focusing degrees at the imager heights H1 to H7 is completed in this way, the imager height having a highest focusing degree is specified as the focusing position similarly to the conventional technique (Step S107).

On the other hand, if the acquisition of the saturation consecutive region is confirmed in Step S105, a series of processings (Steps S108 to S112) described below are performed. In Step S108, the focusing degree indicating a degree of focusing is calculated from the image GC of each object image G1 to G7 (corresponding to a "fourth step" of the invention). Subsequent to that, the calculated focusing degrees are arranged in an order of the imager heights (focal positions) H1 to H7 (Step S109). Then, the presence of a local minimum value of the focusing degree is determined in the saturation consecutive region (Step S110). Here, a reason for determining the presence of the local minimum value is based on the above property and this reason is specifically described with reference to FIGS. 4 and 5.

Figure 5:
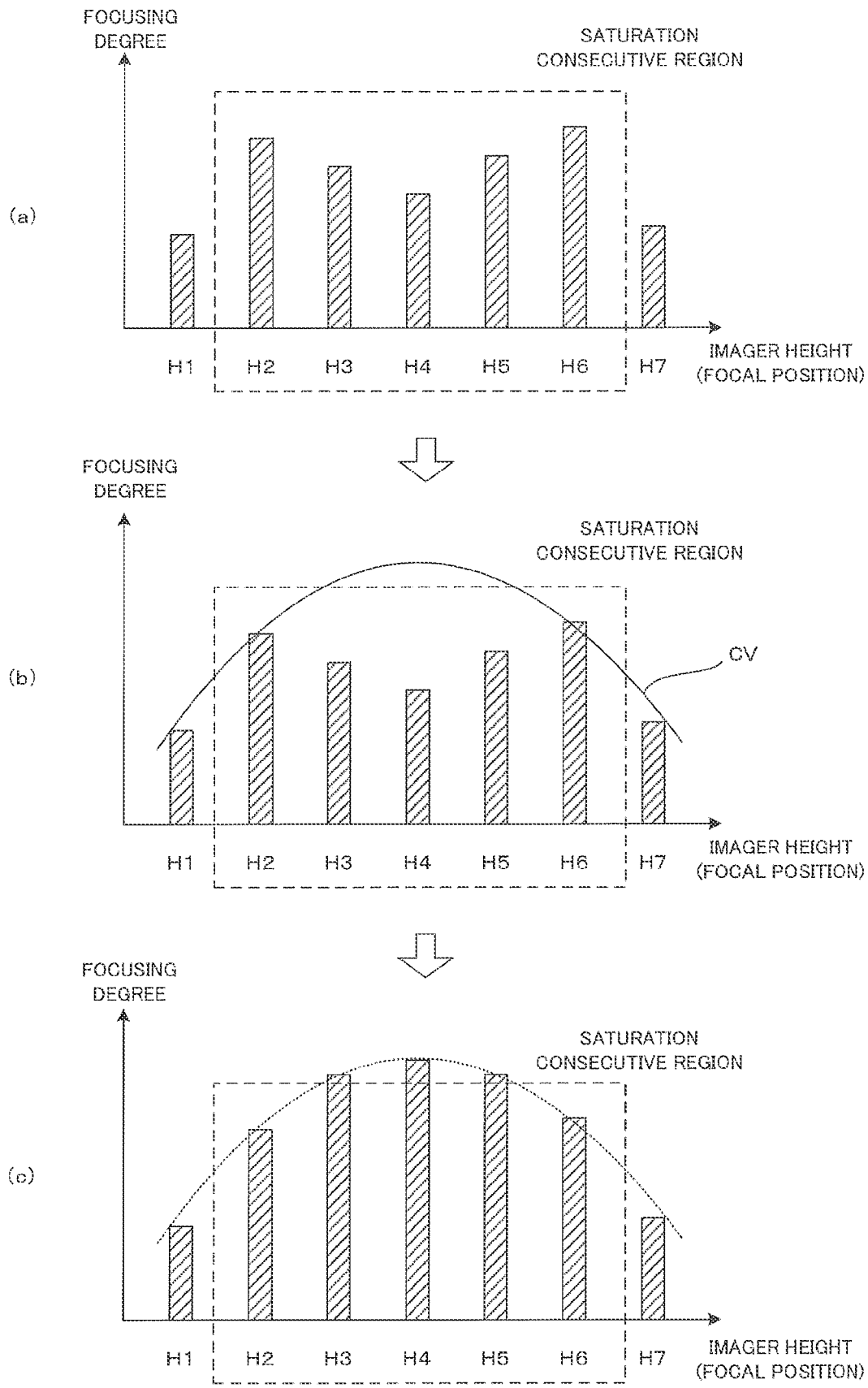
FIG. 5 shows graphs schematically showing some of the steps performed in a first embodiment of the focusing position detection method.

FIG. 5 shows graphs schematically showing some of the steps performed in a first embodiment of the focusing position detection method. An upper part of FIG. 4 is a bar graph showing a change of the focusing degree in relation to the imager height obtained by performing Step S109 described above. Further, middle and lower parts of FIG. 4 show graphs showing correction contents of the focusing degree and are described later.

In the saturation consecutive region, the saturated pixels constituting the image GC have a luminance exceeding the luminance Lmax at any of the imager heights H2 to H6 as shown in FIG. 4. Accordingly, it is difficult to determine the focusing position from the luminance. However, the area of the saturated pixels changes according to the amount of deviation from the focusing position. That is, the area of the saturated pixels is small at the imager height closest to the truly focused height (focusing position), out of the imager heights H2 to H6, e.g. at the imager height H4 of FIG. 4. In contrast, the area of the saturated pixels becomes gradually larger with distance from the imager height H4. Thus, the focusing degree at the imager height H4 is a local minimum value and, if the imager height having a highest focusing degree is specified as the focusing position as before, the focusing position is erroneously detected. Accordingly, in this embodiment, the presence of the local minimum value of the focusing degree is confirmed in the saturation consecutive region ("YES" in Step S110) and, thereafter, the focusing degrees of the object images G2 to G6 included in the saturation consecutive region are corrected (Step S111). On the other hand, if the local minimum value of the focusing degree is absent, advance is made to Step S106 and the focusing position is obtained similarly to the conventional technique. As just described, in this embodiment, Steps S110 and S111 respectively correspond to a "fifth step" and a "sixth step" of the invention.

In Step S111, the focusing degrees of the saturated object images are corrected utilizing polynomial approximation obtained from the focusing degrees at and around the shortest focal position and the longest focal position in the order of the focal positions in the saturation consecutive region. More particularly, as shown in the graph in the middle part of FIG. 5, an approximation curve CV by a polynomial is calculated from the following first to fourth coordinate data. That is, First coordinate data: a combination of the imager height H2 (first focal position) lowest in the saturation consecutive region and the focusing degree at this imager height H2, Second coordinate data: a combination of the imager height H1 (second focal position) adjacent to the imager height H2 and the focusing degree at this imager height H1, Third coordinate data: a combination of the imager height H6 (third focal position) highest in the saturation consecutive region and the focusing degree at this imager height H6, Fourth coordinate data: a combination of the imager height H7 (fourth focal position) adjacent to the imager height H6 and the focusing degree at this imager height H7. Subsequent to that, each of the focusing degrees at the imager heights H2 to H6 included in the saturation consecutive region is polynomially approximated and the focusing degrees in the saturation consecutive region are corrected as shown in the lower part of FIG. 5. In this way, the focusing degrees suppressed to be low due to the above property are reversely corrected.

If the focusing degree correction process is completed in this way, the focusing position is specified based on the focusing degrees in the saturation consecutive region corrected in Step S111 and the focusing degrees in regions other than the saturation consecutive region, which are regarded as an exception for correction in Step S111 (Step S112). As just described, this step corresponds to an example of a "seventh step" of the invention.

As described above, according to the first embodiment, the focusing position is specified after the focusing degrees in the saturation consecutive region are corrected based on the property that the focusing degree decreases in the saturation consecutive region as the imager height (focal position) approaches the focusing position. Thus, even if the object images captured and acquired by the imager 13 include the high-luminance region, i.e. the saturation region, the focusing position can be stably detected.

Further, if imaging is performed again with setting conditions (light emission time, exposure time, etc.) of an illumination element and a camera included in the imager 13 adjusted when the saturation region occurs, the occurrence of the saturation region is suppressed. Thus, the focusing position can be specified by the previous detection method by combining light amount adjustment. However, because the imaging object is cells, the repetition of re-imaging causes problems (phototoxicity, fluorescence fading) for the cells and a problem of an imaging waiting time. In contrast, according to this embodiment, re-imaging needs not be repeated to detect the focusing position and the focusing position can be stably detected while solving the above problems.

Although the focusing degree correction process (Step S111) in the saturation region is performed by the polynomial approximation method based on the approximation curve CV in the above first embodiment, the process may be performed by a method using differences (second embodiment) or a method using weighting (third embodiment).

Figure 6:
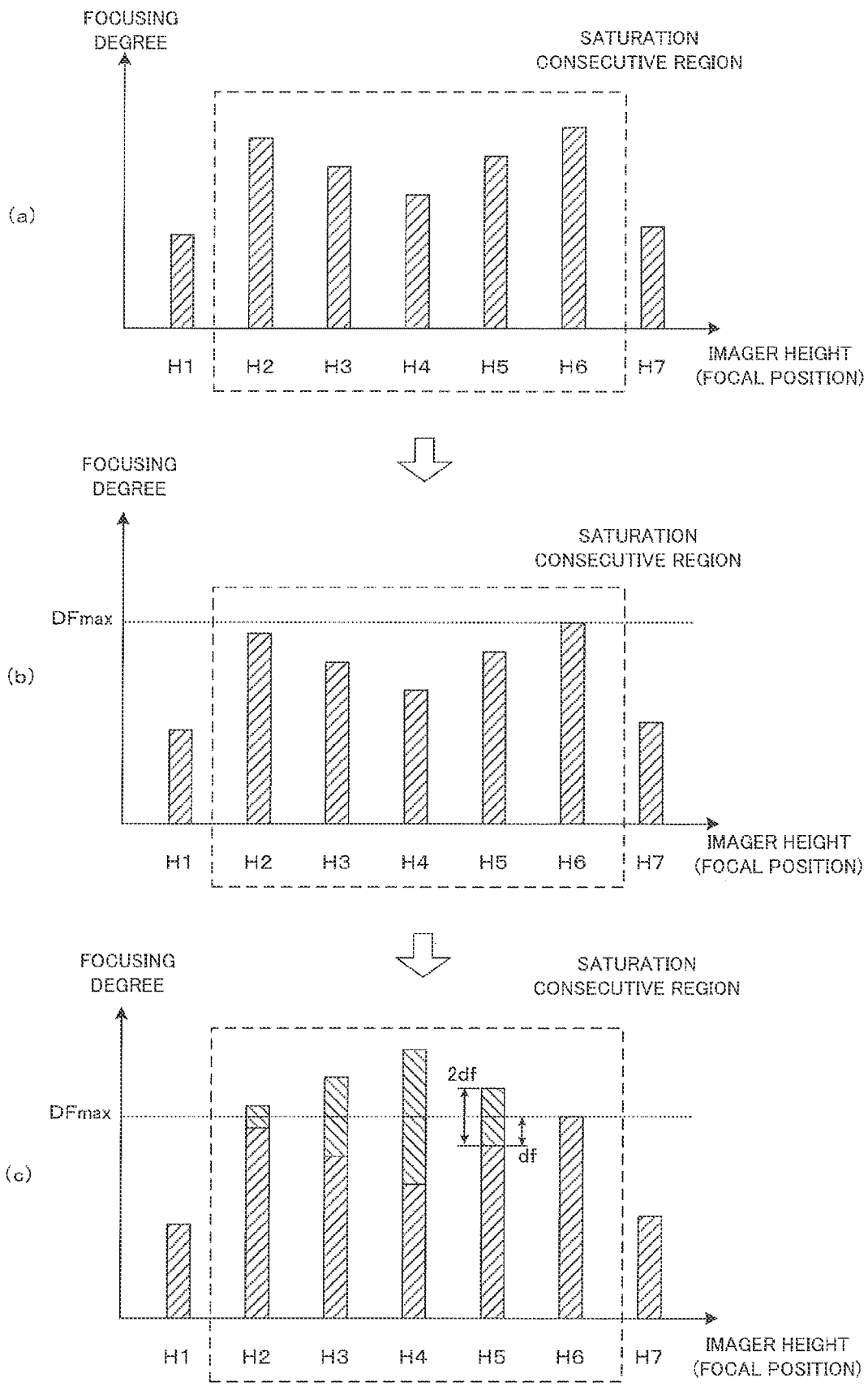
FIG. 6 shows graphs schematically showing contents of a focusing degree correction process in the second embodiment of the focusing position detection method according to the invention.

FIG. 6 shows graphs schematically showing contents of a focusing degree correction process in the second embodiment of the focusing position detection method according to the invention. The second embodiment is different from the first embodiment only in the focusing degree correction process and the other configuration is the same as in the first embodiment. This point also applies to the third embodiment to be described later.

In the focusing degree correction process of the second embodiment, each focusing degree in a saturation consecutive region is corrected by adding a weight corresponding a difference of the focusing degree from a maximum focusing degree having a maximum value, out of those focusing degrees. The following steps are performed as an example. A maximum focusing degree DFmax in the saturation consecutive region, e.g. a focusing degree at an imager height H6, is acquired in an example shown in a middle part of FIG. 6. Then, a difference df (only shown for an imager height H5) from the maximum focusing degree DFmax is calculated as shown in a lower part of FIG. 6 for each of the focusing degrees at imager heights H2 to H5 other than the imager height H6, and twice that value (=2×df) is added to the initial focusing degree. In this way, the focusing degree suppressed to be low due to the above property is reversely corrected. As a result, functions and effects similar to those of the first embodiment are obtained.

Figure 7:
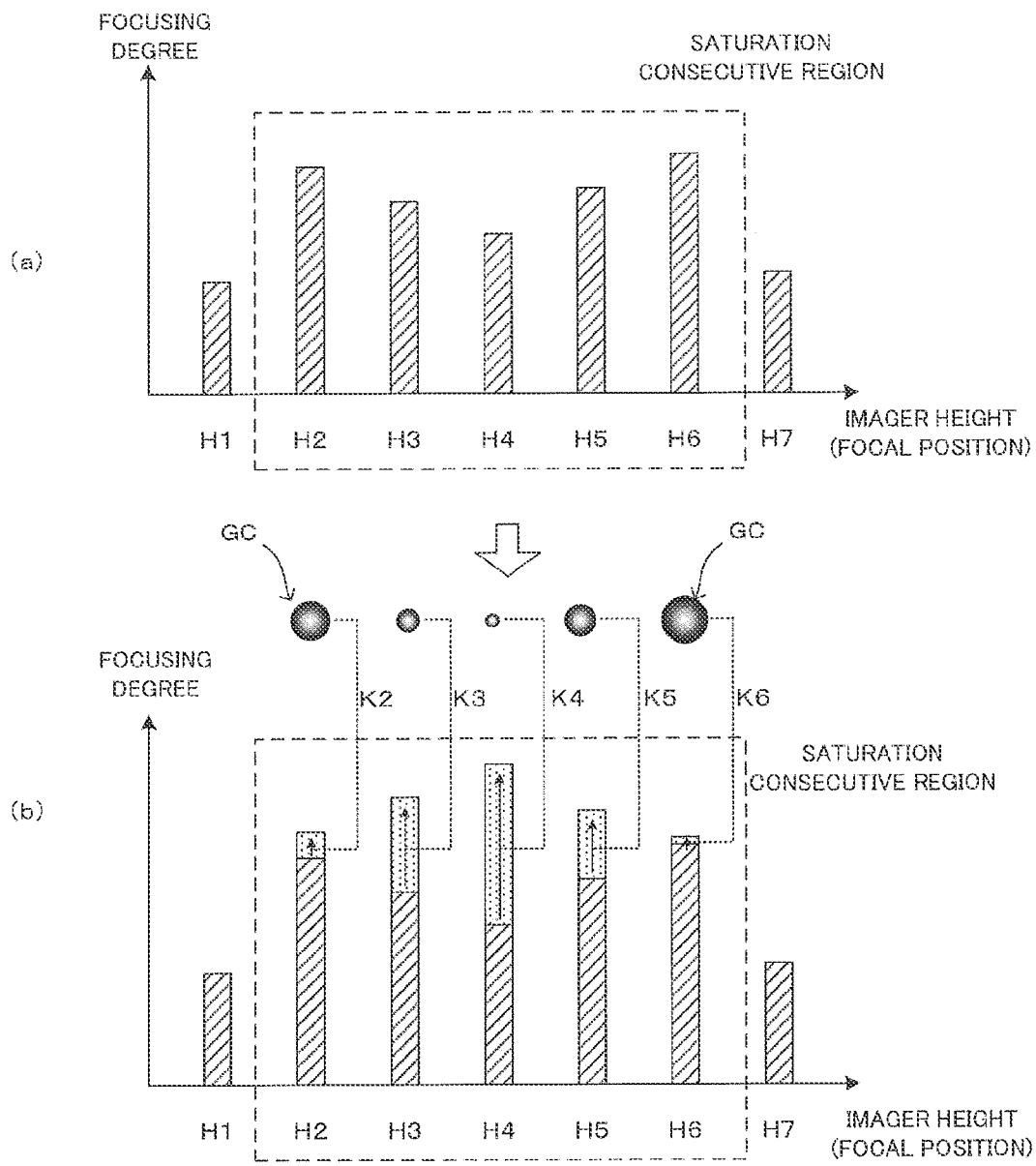
FIG. 7 shows graphs schematically showing contents of a focusing degree correction process in the third embodiment of the focusing position detection method according to the invention.

FIG. 7 shows graphs schematically showing contents of a focusing degree correction process in the third embodiment of the focusing position detection method according to the invention. In the focusing degree correction process of the third embodiment, the number of pixels constituting an image GC in a saturation region is obtained in a saturation consecutive region and a corresponding weighting factor K2 to K6 is acquired. More specifically, a larger weight is given as the number of the pixels decreases. The weighting factor K2 to K6 is added for each imager height. In this way, the focusing degree suppressed to be low due to the above property is reversely corrected. As a result, functions and effects similar to those of the first embodiment are obtained.

Although the number of the saturation regions is not limited in the above embodiments, light amount adjustment may be performed according to the number of the saturation regions (fourth embodiment). The fourth embodiment is described with reference to FIG. 8.

Figure 8:
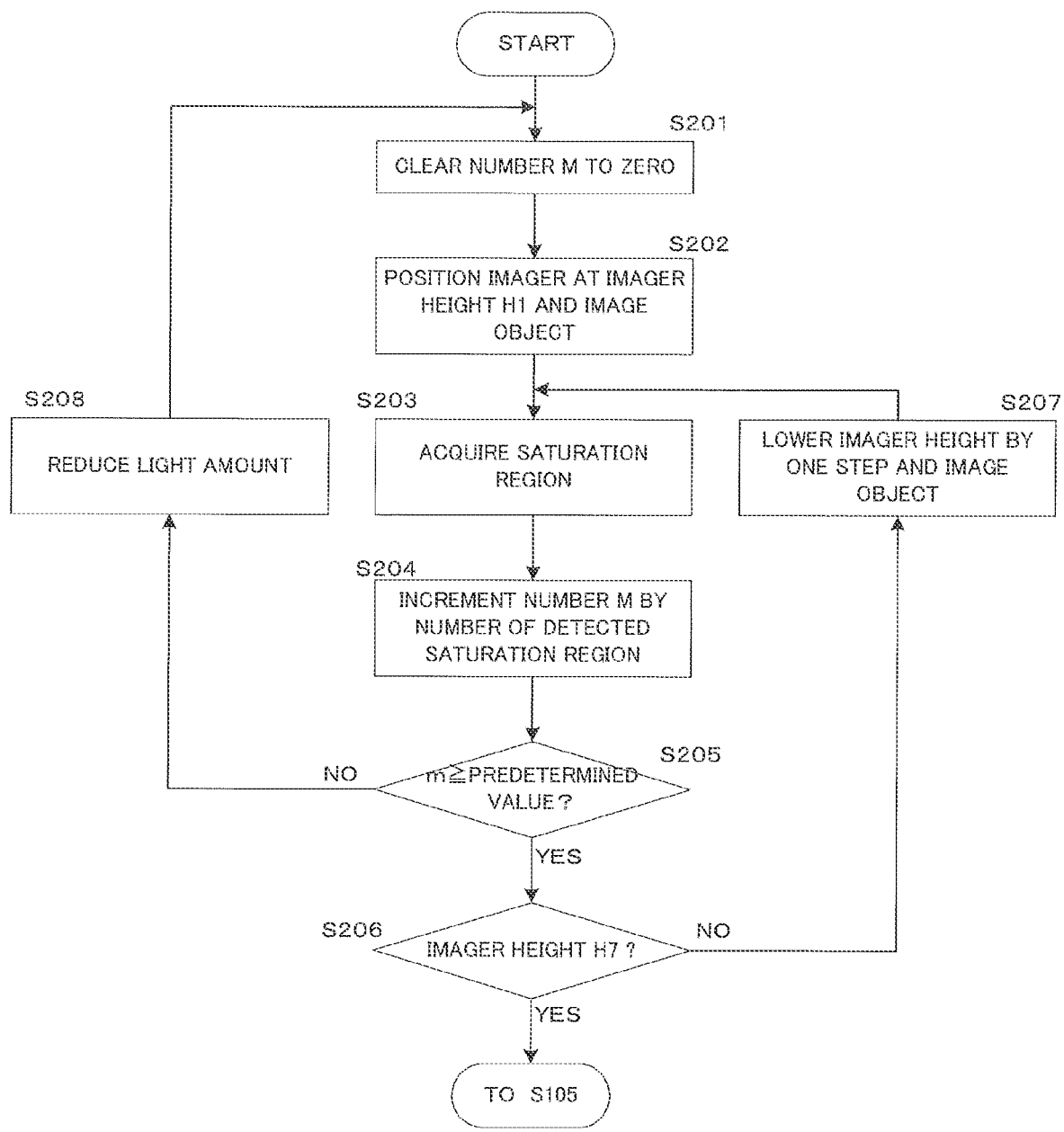
FIG. 8 is a flow chart showing an object image acquisition process in the fourth embodiment of the focusing position detection method according to the invention.

FIG. 8 is a flow chart showing an object image acquisition process in the fourth embodiment of the focusing position detection method according to the invention. Also in the fourth embodiment, steps (Steps S202 to S204, S206, S207) similar to steps (Steps S101 to S104) of the first embodiment are basically performed. That is, seven object images G1 to G7 are acquired by imaging a cell and the like C by the imager 13 while making a distance from the imager 13 to the cell and the like C different in seven stages. Further, saturation regions exceeding a predetermined luminance Lmax are detected based on the object images G1 to G7.

Here, if a light amount is excessive, the number of the saturation regions increases while object images are captured. Accordingly, by monitoring the number of the saturation regions, whether the light amount is excessive or proper can be determined. Further, if the light amount is detected to be excessive, the light amount can be optimized by being reduced.

In the fourth embodiment, Steps S201, S204, S205 and S208 are added as steps for light amount adjustment. That is, a number m is cleared to zero (Step S201) before the object images G1 to G7 are acquired. Every time the saturation region based on the object image is detected (Step S203), the number m is incremented by the number of the detected saturation region (Step S204). Here, if the light amount is excessive, the number M increases accordingly. If it is detected in Step S205 that the number m has reached a predetermined value P (where P is a natural number equal to or more than four and equal to or less than M) or more, the focusing degree correction process (Step S111) and the specification of the focusing position (Step S112) with this light amount are stopped and, after the light amount is reduced (Step S208), return is made to Step S201 and the detection of the object images G1 to G7 and the saturation regions are performed again with a low light amount. Therefore, in the fourth embodiment, the object images G1 to G7 are acquired with the light amount adjusted to a proper level and, after a proper number of the saturation regions are detected, advance is made to Step S105 and the focusing position is stably detected as in the first embodiment.

Further, in the above first to fourth embodiments, the focusing degrees of all the object images are uniformly calculated by the conventional technique if the saturation consecutive region is absent ("NO" in Step S105). Here, even if the saturation consecutive region is absent, some of the object images may include the saturation region. Accordingly, a focusing degree calculation process using different focusing degree calculation methods depending on the presence or absence of the saturation region(s) (fifth embodiment) may be applied instead of the conventional technique.

Figure 9:
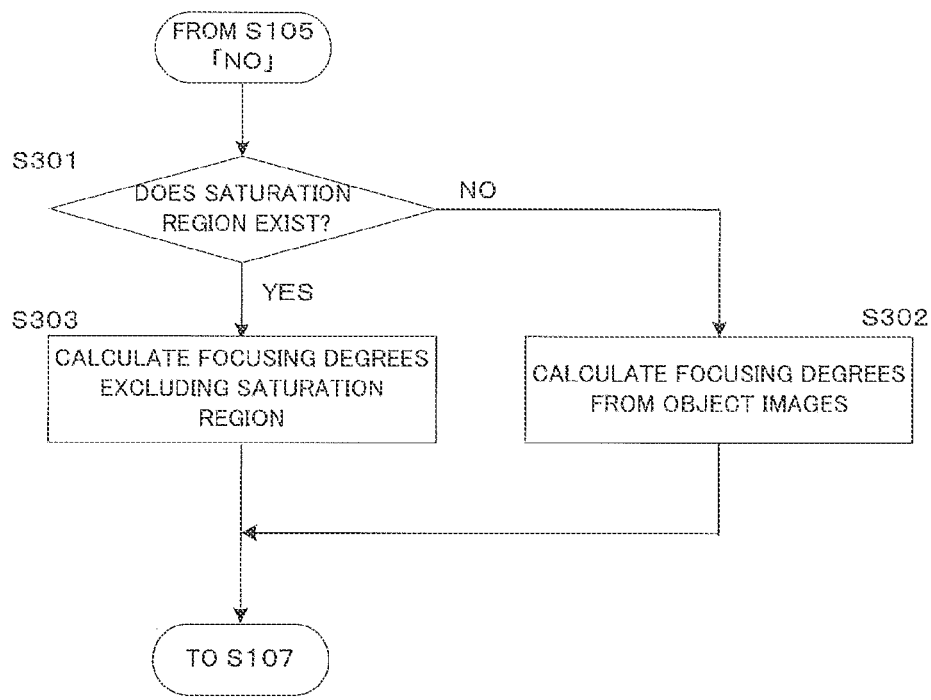
FIG. 9 is a flow chart showing a part of a process performed in the fifth embodiment of the focusing position detection method according to the invention.
Figure 10:
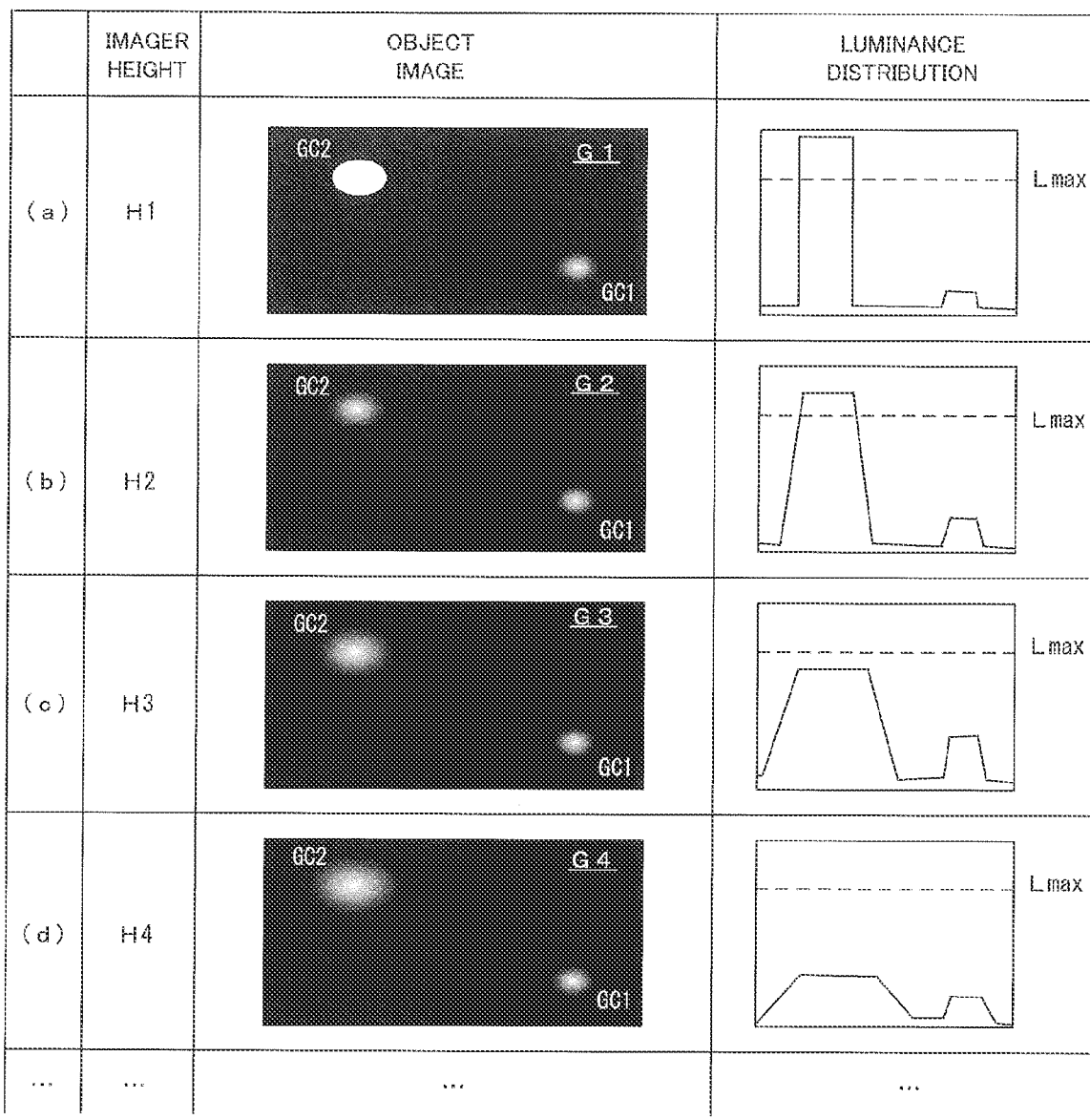
FIG. 10 is a chart showing examples of object images acquired by an imager.

FIG. 9 is a flow chart showing a part of a process performed in the fifth embodiment of the focusing position detection method according to the invention. FIG. 10 is a chart showing examples of object images acquired by an imager. Note that only first four object images G1 to G4, out of seven object images G1 to G7, are shown by repeating Steps S101 to S104 to facilitate the understanding of the following description. However, in an actual process, all the object images G1 to G7 are processing objects. Further, in FIG. 10, reference sign GC1 denotes an image of a cell or the like C originally desired to be imaged, whereas reference sign GC2 denotes an image of a dead cell.

In the fifth embodiment, if it is determined in Step S105 that a saturation consecutive region is absent, for example, as shown in FIG. 10, the presence of a saturation region (high-luminance region) is determined in the object images G1 to G7. If dead cells different from an original imaging object are included in a specimen, a high-luminance region where the luminance of pixels corresponding to the dead cell or the like is extremely high, i.e. the saturation region, may be present. If a saturation consecutive region in which three or more object images including the saturation region are consecutive in an imager height direction, a focusing position can be specified as in the first embodiment. On the other hand, the saturation consecutive region may be absent, but the saturation regions may be present ("YES" in Step S301) as shown in FIG. 10. There is also a case where the saturation region is not present at all ("NO" in Step S301). Accordingly, in the fifth embodiment, if the saturation region is not present at all, the focusing degrees are calculated from the object images G1 to G7 according to the conventional technique as in the first embodiment (Step S302). On the other hand, if only the object images G1, G2 captured at the imager heights H1, H2 include the saturation region, for example, as shown in FIG. 11, the focusing degrees are calculated, excluding the saturation regions as described below (Step S303).

Figure 11:
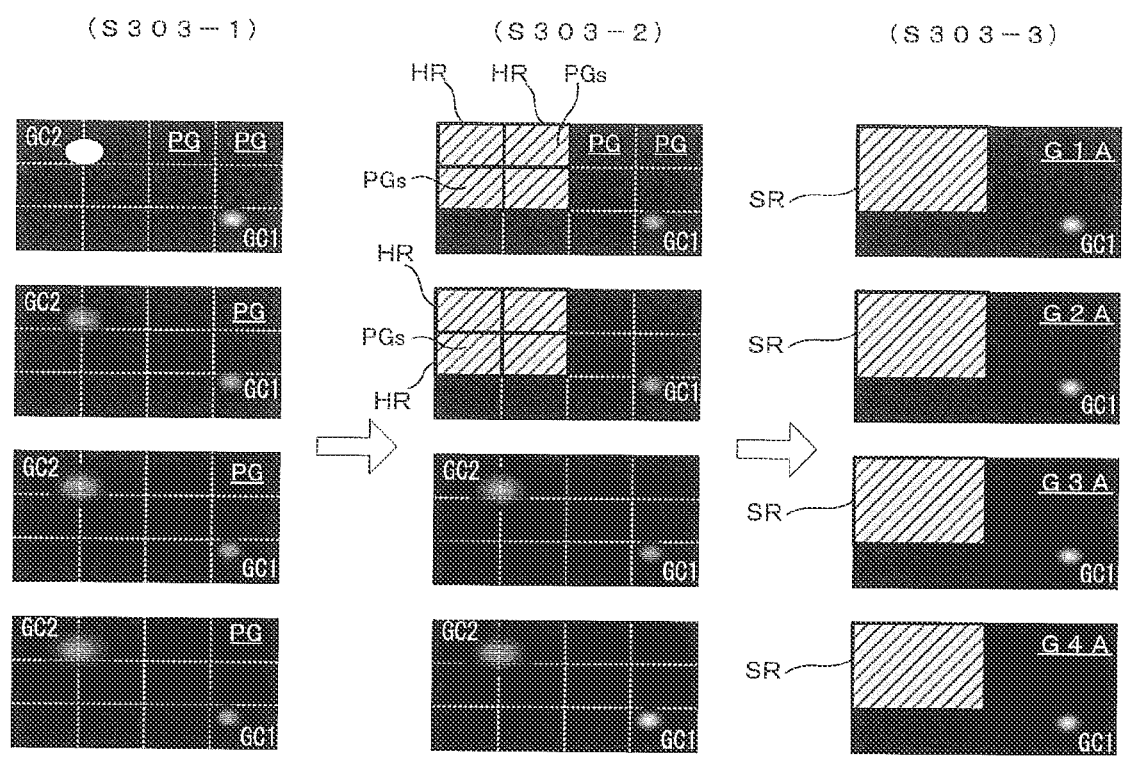
FIG. 11 shows charts schematically showing an example of a focusing degree process performed in the fifth embodiment of the focusing position detection method according to the invention.

FIG. 11 shows charts schematically showing an example of a focusing degree process performed in the fifth embodiment of the focusing position detection method according to the invention. In Step S303, the object image G1 is divided into a plurality of (a total of 12 in a 4×3 matrix in the fifth embodiment) local images PG (Step S303-1). Then, regions where the local images PG exceeding a predetermined luminance Lmax are present, i.e. high-luminance regions HR, are obtained (Step S303-2). Whether or not each local image PG exceeds the predetermined luminance Lmax can be determined, for example, based on the number of pixels exceeding the predetermined luminance Lmax, out of a plurality of pixels constituting the local image PG.

Note that the local image PG having a high luminance exceeding the predetermined luminance Lmax is called a "high-luminance local image PGs" as appropriate. Further, to clearly show the high-luminance regions HR and the high-luminance local images PGs, the high-luminance regions HR are enclosed by thick lines and the high-luminance local images PGs are hatched in (S303-2) of FIG. 5. If the high-luminance regions HR are obtained in this way, the saturation regions are acquired based on the high-luminance regions HR (Step S303-3). Such a saturation region acquisition process is successively performed also for the object images G2 to G7, following the above object image G1.

The high-luminance region HR in the object image G2 is extended to a wider range from the high-luminance region HR in the object image G1. In other words, the saturation region SR consisting of the high-luminance regions HR in the object image G2 includes the saturation region (not shown) consisting of the high-luminance regions HR in the object image G1. Moreover, as shown in the column of "luminance distribution" of FIG. 10, the luminance distribution of the image GC2 has a sharp profile at the focal position (imager height H1), and on the other hand, as the distance from the focal position becomes larger, the luminance becomes lower around the contour and on the whole while the luminance distribution has a profile with its skirt part becoming wider. For this reason, the luminance of the image GC2 of the dead cell included in each of the object images G3 and G4 is not higher than the predetermined luminance Lmax but is equal to or higher than that of the image GC1 of the cells and the like C, and there is high possibility that the detection of the focusing position may be thereby affected.

Accordingly, in the fifth embodiment, the focusing degrees are calculated in consideration of a saturation region SR as a range where the focusing position detection is hindered in each object image G1 to G7. That is, the image in the saturation region SR is regarded as an exception for focusing degree calculation at any of the imager heights H1 to H7. More specifically, the focusing degree indicating a degree of focusing is obtained from an image G1A outside the saturation region SR, out of the object image G1. The focusing degrees of the object images G2 to G7 are also obtained similarly to the focusing degree of the object image G1.

If the calculation of the focusing degrees at the imager heights H1 to H7 is completed in this way when the saturation consecutive region is absent, advance is made to Step S107 and the imager height having a highest focusing degree is specified as the focusing position similarly to the conventional technique.

As described above, according to the fifth embodiment, the image in the saturation region SR is regarded as an exception for focusing degree calculation when the saturation consecutive region is absent, but the saturation region SR is present. Further, the image in the saturation region SR is regarded as an exception for focusing degree calculation not only for the object images G1, G2 in which the saturation region SR appears as shown in FIG. 11, but also for all the object images G1 to G7. Thus, the influence of dead cells and the like can be reliably excluded and the focusing position can be more accurately detected. As a result, even if some of the object images G1 to G7 include the saturation region SR, the focusing position can be stably detected. Steps S303 and S107 performed in the fifth embodiment in this way respectively correspond to examples of an "eighth step" and a "ninth step" of the invention.

Note that the invention is not limited to the embodiments described above and various changes other than the aforementioned ones can be made without departing from the gist of the invention. For example, the distance from the imager 13 to the imaging object (cell and the like C) is made different in seven stages, i.e. M=7 is set, but the number M of the imager heights is not limited to this and M may be equal to 3 to 6, eight or more.

If a predetermined number or more of the saturation regions are consecutive, an abnormal region may be determined and excluded from focusing degree calculation targets. In this way, the calculation of the focusing degrees not contributing to the detection of the focusing position can be prevented and a reduction in the detection accuracy of the focusing position can be reliably prevented.

Further, though the control program including the focusing position detection program is stored in the memory 145 in advance in the above-described embodiments, such a configuration may be achieved in which a reader 149 such as a disk drive or the like which is electrically connected to the interface (I/F) 142 reads an installation program. Specifically, the above-described focusing position detection program recorded in a non-transitory computer readable recording medium M such as a CD-ROM (Compact Disc Read Only Memory), a DVD-ROM (Digital Versatile Disc Read Only Memory), or the like to be inserted into the disk drive is computer-readable recorded and the disk drive may serve as the reader 149. In other words, even in a case where the imaging apparatus 1 cannot perform the above-described the focusing position detection method, the imaging apparatus 1 may be upgraded to perform the above-described focusing position detection method by incorporating the above-described focusing position detection program through installation thereof. Further, the focusing position detection program may be read by using a non-transitory computer readable recording medium other than the CD-ROM or the DVD-ROM as the recording medium M. Furthermore, the focusing position detection program may be read by using a communication part.

Although the invention has been described along with the specific embodiment above, this description is not intended to be interpreted in a limited sense. If the description of the invention is referred to, various modifications of the disclosed embodiment would be apparent to a person skilled in this art, similarly to other embodiments of the invention. Therefore, the appended claims are through to include these modifications or embodiments without departing from the true scope of the invention.

This invention can be applied to focusing position detection techniques in general for detecting a focusing position based on a plurality of object images acquired by imaging an imaging object by an imager while changing a focal position along an optical axis.

What is claimed is:

1. A focusing position detection method comprising:
    a first step of acquiring M (where M is a natural number equal to or more three) object images by imaging an imaging object by an imager while changing a focal position in M stages along an optical axis;
    a second step of acquiring a saturation region exceeding a predetermined luminance from the M object images;
    a third step of acquiring a saturation consecutive region, the saturation region being included in all N (where N is a natural number equal to or more than three and equal to and less than M) object images acquired while successively changing the focal position in N stages along the optical axis in the saturation consecutive region;
    a fourth step of obtaining a focusing degree indicating a degree of focusing from the object image for each object image;
    a fifth step of determining whether or not a local minimum value of the focusing degree is present when the focusing degrees obtained in the fourth step are arranged in an order of the focal positions;
    a sixth step of correcting N focusing degrees corresponding to the saturation consecutive region, out of M focusing degrees obtained in the fourth step, based on a property that the focusing degree decreases as the focal position approaches the focusing position in the saturation consecutive region when the presence of the local minimum value is determined in the fifth step; and
    a seventh step of specifying the focusing position based on N focusing degrees corrected by the sixth step and (M-N) focusing degrees not corrected by the sixth step, wherein M-N is a difference between natural numbers M and N.

2. The focusing position detection method according to claim 1, wherein:
    the sixth step includes a step of correcting the N focusing degrees obtained in the fourth step by polynomial approximation obtained from the focusing degrees at and around a shortest focal position and a longest focal position in the order of the focal positions in the saturation consecutive region.

3. The focusing position detection method according to claim 1, wherein:
    the sixth step includes a step of correcting each of the N focusing degrees by adding a weight corresponding to a difference of the focusing degree from a maximum focusing degree having a maximum value, out of the N focusing degrees.

4. The focusing position detection method according to claim 1, wherein:
    the sixth step includes a step of correcting the focusing degree by adding a weight corresponding to the number of pixels constituting the saturation region to the focusing degree at each focal position in the saturation consecutive region.

5. The focusing position detection method according to claim 1, wherein:
    the sixth and seventh steps are stopped if the number of the saturation regions is determined to be equal to or more than a predetermined number P (where P is a natural number equal to or more than four and equal to or less than M).

6. The focusing position detection method according to claim 5, wherein:
    the first to seventh steps are performed again after an amount of light for illuminating the imaging object at the time of imaging by the imager is reduced after the sixth and seventh steps are stopped.

7. The focusing position detection method according to claim 1, further comprising:
    an eighth step of calculating a focusing degree indicating a degree of focusing from an image outside the saturation region, out of the object image, for each object image when the saturation consecutive region is not acquired; and
    a ninth step of specifying a focusing position based on a plurality of the focusing degrees calculated in the eighth step.

8. A focusing position detection device that detects a focusing position based on M (where M is a natural number equal to or more three) object images acquired by imaging an imaging object by an imager while changing a focal position in M along an optical axis, the device comprising:
    a processor; and
    a memory configured to store instructions, when executed by the processor, causing the processor to:
    acquire a saturation region exceeding a predetermined luminance from the M object images;
    acquire a saturation consecutive region, the saturation region being included in all N (where N is a natural number equal to or more than three and equal to and less than M) object images acquired while successively changing the focal position in N stages along the optical axis in the saturation consecutive region;

calculate a focusing degree indicating a degree of focusing from the object image for each object image;

correct the N focusing degrees corresponding to the saturation consecutive region, out of M focusing degrees, based on a property that the focusing degree decreases as the focal position approaches the focusing position in the saturation consecutive region when the focusing degrees arranged in an order of the focal positions and calculated by the focusing degree calculator have a local minimum value; and specify the focusing position based on N focusing degrees corrected by the focusing degree corrector and (M-N) focusing degrees not corrected by the focusing degree corrector, wherein M-N is a difference between natural numbers M and N.

9. A non-transitory computer readable recording medium having stored thereon a computer program, wherein a computer is caused to carry out the focusing position detection method according to claim 1.

* * * * *